Figure 3:
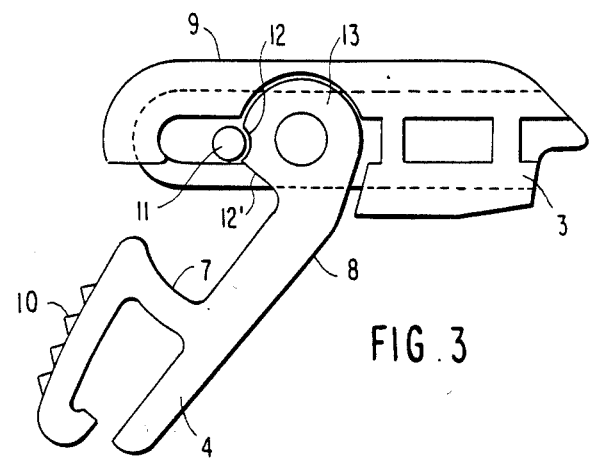

United States Patent [19]

Epple et al.

[11] Patent Number: 4,670,934
[45] Date of Patent: Jun. 9, 1987

[54] WINDSHIELD WIPER

[75] Inventors: Anton Epple, Rottenburg; Hans Trube, Herrenberg; Martin Pfeiffer, Stuttgart; Guntram Huber, Aidlingen; Josef Berger, Wolfschlugen, all of Fed. Rep. of Germany

[73] Assignee: Daimler-Benz Aktiengesellschaft, Fed. Rep. of Germany

[21] Appl. No.: 791,924

[22] Filed: Oct. 28, 1985

[30] Foreign Application Priority Data

Oct. 29, 1984 [DE] Fed. Rep. of Germany ....... 3439523

[51] Int. Cl.$^4$ ............................................... B60S 1/40
[52] U.S. Cl. .................................................. 15/250.32
[58] Field of Search ............ 15/250.32, 250.35, 250.42

[56] References Cited

U.S. PATENT DOCUMENTS

| 3,896,519 | 7/1975 | Pankow | 15/250.32 |
| 4,179,767 | 12/1979 | Weiler et al. | 15/250.32 |
| 4,450,602 | 5/1984 | Maiocco | 15/250.32 |

FOREIGN PATENT DOCUMENTS

| 0158071 | 10/1985 | European Pat. Off. | 15/250.32 |
| 1087481 | 8/1960 | Fed. Rep. of Germany | 15/250.32 |
| 2709893 | 9/1978 | Fed. Rep. of Germany | |
| 1235573 | 5/1960 | France | |

Primary Examiner—James Kee Chi
Attorney, Agent, or Firm—Barnes & Thornburg

[57] ABSTRACT

A windshield wiper for motor cars with a wiper arm which terminates at its free end in a U-shaped hook, while a connecting piece articulated to a wiper blade and preferably consisting of plastics is slidable and anchorable between the members of the U. In order to ensure a play-free connection even in the longitudinal direction of the wiper arm and/or wiper blade, a fastening yoke, which is articulated to the connecting piece at a pivot axis thereof, in its closed position, engages externally and clamps around the U-shaped hook and tensions the connecting piece towards the wiper arm.

6 Claims, 5 Drawing Figures

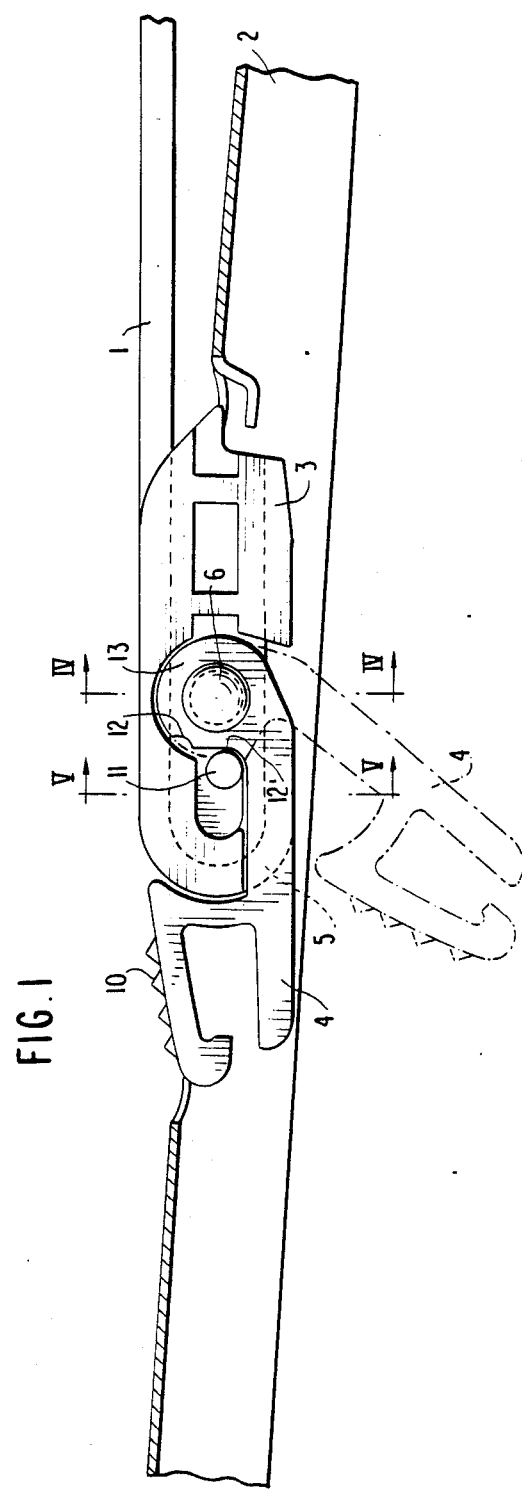
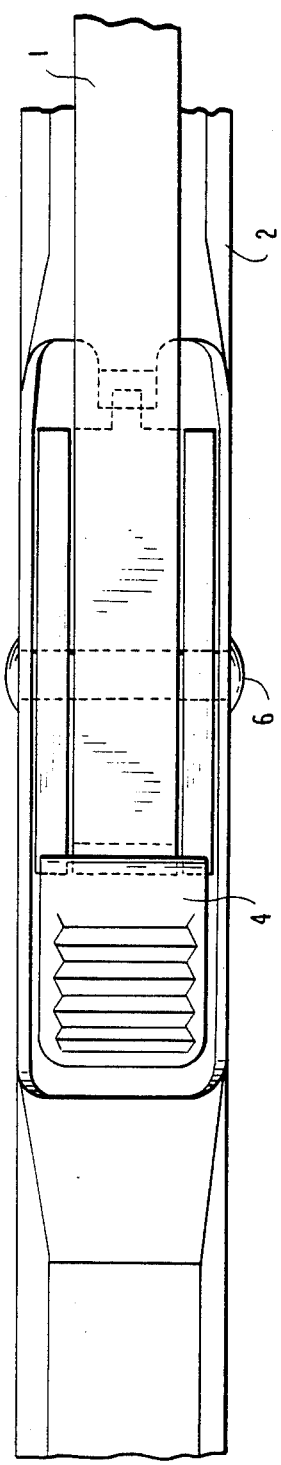

WINDSHIELD WIPER

The invention relates to a windshield wiper with a wiper arm which terminates at its free end in a U-shaped hook, while a connecting piece articulated to a wiper blade, preferably consisting of plastics, is slidable and anchorable between the members of the U-shaped means.

A windshield wiper of this type is known from German Offenlegungsschrift No. 2,709,893, for example. A connection between wiper arm and wiper blade shown there is adequate for a conventional windshield wiper which only executes a reciprocating pivoting movement.

However, circumstances are different in the case of a windshield wiper which, in addition, executes extending movements in the region of the corners of the windshield. In this case it is necessary, in order to reliably eliminate the generation of noise, to ensure a play-free connection even in the direction of the longitudinal extension of the windshield wiper arm and/or windshield wiper blade.

A windshield wiper is known from French Pat. No. 1,235,573, which exhibits a clamp spring attached to the wiper arm and enclosing the pivot axis of the wiper blade on a part of its circumference. Since the clamp spring has to be dimensioned so that easy exchange of the wiper blade is ensured—although a tool in the form of a screwdriver, etc. will be required for the purpose of this case—it would scarcely be possible by the known arrangement to obtain a play-free guidance for the rather abrupt retracting and extending movement of a relatively large and heavy wiper blade.

It is therefore an object of the invention to provide an improved windshield wiper for vehicles.

It is an object of the present invention to develop a windshield wiper of the type in question so that a play-free connection between wiper arm and wiper blade is ensured.

It is another object of the invention to provide a fastening yoke, which is articulated to the connecting piece in the pivot axis thereof, in its closed position engages externally clampingly round the U-shaped hook and tensions the connecting piece towards the wiper arm.

Figure 4:
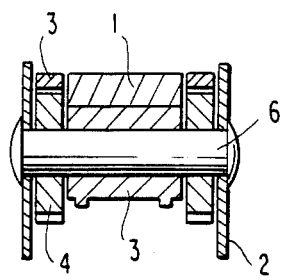
Figure 5:
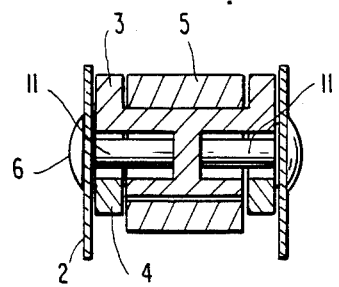

These and other objects, features and advantages of the present invention will become more apparent from the following description when taken in connection with the accompanying drawings which show, for the purposes of illustration only, one embodiment in accordance with the present invention, and wherein:

FIG. 1 shows a side elevation of the connecting region between wiper arm and wiper blade, with fragmented wiper blade, FIG. 2 shows a plan of the illustration according to FIG. 1, FIG. 3 shows a side elevation of the connecting piece and of the fastening yoke, FIG. 4 shows a section made along the line IV—IV in FIG. 1, and FIG. 5 shows a section made along the line V—V in FIG. 1.

Referring now to the drawings wherein like reference numerals are used to designate like parts and more particularly to FIGS. 1 and 2 show, in part, a windshield wiper installation, a wiper 1 and a wiper blade 2 which are held together for easy release by a connecting piece 3 consisting of plastics and a fastening yoke 4 articulated to the latter.

The detailed construction of the section region is as follows:

The wiper arm 1 terminates in a U-shaped hook 5, into which the connecting piece 3, which is attached pivotably to the wiper blade 2 by a rivet 6, is slidable. The fastening yoke 4 is articulated by the same rivet 6 to the connecting piece 3, and therefore to the wiper blade 2, which is illustrated in continuous lines in its operative position and in dashed lines in an extended position in FIG. 1 of the drawing. In its operative position the fastening yoke 4, by a correspondingly shaped surface 7, FIG. 3, abuts the external surface of the arc of the U of the hook 5, and therefore ensures play-free tensioning of the connecting piece 3 with respect to the wiper arm 1.

For guidance in the transverse direction, the members of the U-shaped hook 5 of the wiper arm 1 are enclosed laterally by web-like edge regions 8, 9 of the fastening yoke 4 and/or of the connecting piece 3.

The fastening yoke 4 is constructed as a push-button 10 at its free end of the side remote from the windshield.

In closed position, the fastening yoke 4 is shown in FIG. 1 with catch bolts 11, FIGS. 1, 3 and 5, arranged laterally in the connecting piece 3, FIG. 5, which may engage the fastening yoke at 12'.

In order to define the open position of the fastening yoke 4, illustrated in dashed lines in FIG. 1 of the drawing, catch bolts 11, which are arranged laterally on the connecting piece 3, cooperate with depression 12 in a collar 13 surrounding the pivot axis formed by the rivet 6.

The open fastening yoke 4 in opened position abuts the wiper blade 2 on the side of the latter remote from the wiper rubber and produces such a curvature thereof that it does not rest flush on the windshield, so that it is immediately visible when the catch mechanism is not closed.

While the windshield wiper apparatus of the invention has application to windshields of motor cars, it will be appreciated that the invention has general application to any apparatus, vehicular or otherwise, where cleaning a windshield is required.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A fastening arrangement for use with a windshield wiper arrangement of the type having a wiper arm which terminates at its free end in a U-shaped hook, and a connecting piece articulated to a wiper blade at a pivot axis, which connecting piece is slidable and anchorable between members of the U-shaped hook, comprising:

a fastening yoke pivotally articulated to the connecting piece at the pivot axis, said fastening yoke having a closed position and an open position, said fastening yoke externally engaging and clamping around the U-shaped hook in the closed position to tension the connecting piece toward the wiper arm and to anchor the connecting piece between members of the U-shaped hook.

2. A windshield wiper according to claim 1, wherein a surface of the fastening yoke facing an outer arc of the U is configured to engage the configuration of the arc of the U.

3. A windshield wiper according to claim 1, wherein, when the fastening yoke is closed, the members of the U are enclosed laterally by at least one of web-like edge regions thereof and of the connecting piece.

4. A windshield wiper according to claim 1, further comprising a push-button disposed at a free end of the fastening yoke on the side thereof remote from the windshield.

5. A windshield wiper according to claim 1, wherein the fastening yoke further comprises means for engaging the connecting piece on a catch position in its open position.

6. A windshield wiper according to claim 5, wherein the means for engaging comprises lateral catch bolts on the connecting piece cooperating with depressions in a collar of the fastening yoke surrounding the pivot axis.

* * * * *